United States Patent Office 3,702,893
Patented Nov. 14, 1972

3,702,893
METHOD OF REPELLING RODENTS USING 2,2'-METHYLENEBIS (4,6-DI-TERT.-BUTYL-RESORCINOL)
Charles H. Fuchsman, Cleveland Heights, Ohio, assignor to Ferro Corporation, Cleveland, Ohio
No Drawing. Original application Nov. 24, 1969, Ser. No. 879,559, now Patent No. 3,644,649, dated Feb. 22, 1972. Divided and this application June 1, 1971, Ser. No. 148,977
Int. Cl. A01n 9/00, 9/26
U.S. Cl. 424—346
1 Claim

ABSTRACT OF THE DISCLOSURE

Rodent repellents 2,2'-methylenebis(4,4-di-tert.-butylresorcinol) and 2,2'-thiobis(4,6-di-tert.-butylresorcinol) are taught.

This is a divisional application of copending application, Ser. No. 879,559, filed Nov. 24, 1969, which issued as Pat. 3,644,649 on Feb. 22, 1972.

This invention relates to compounds useful as rodent repellents, a method for their application, and a novel compound.

The compounds can be represented by the formula:

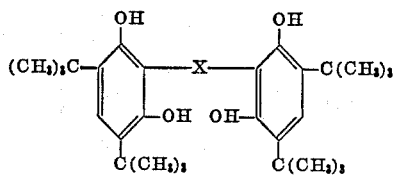

wherein X is $CH_2$ or S. Encompassed within the above formula are the compounds 2,2'-methylenebis(4,6-di-tert.-butylresorcinol) and 2,2'-thiobis(4,6-di-tert.-butylresorcinol) of which the latter is novel.

The thiobis compound (alternatively referred to herein as TDBR) can be prepared by reacting 4,6-di-tert.-butylresorcinol with sulfur chloride in the presence of a solvent. Exemplary of suitable solvents are the chlorinated hydrocarbons such as chloroform, tetrachloroethylene, and perchlorethylene. Perchlorethylene is preferred because the reactants are soluble in it but not the product. Thus the product is easily crystatllized from it. The reaction can be conducted at a temperature between about 0° C. and 60° C. (preferably 0° C. to 30° C.) In a period between about 1 and 6 hours at atmospheric pressure.

The methylenebis compound (alternatively referred to herein as MDBR) can be prepared by reacting 4,6-di-tert.-butylresorcinol with formaldehyde in the presence of an inert solvent and a catalyst. Suitable solvents include hydrocarbons such as alkanes (e.g. hexane), and aromatics (e.g. benzene and toluene).

A hexane-toluene mixture of solvents is preferred because the reactants are soluble in the toluene, but the product is insoluble in hexane. Accordingly with this mixture, the product is easily recovered. Suitable catalysts are the non-oxidizing acid catalysts such as hydrochloric acid, sulfuric acid and boron trifluoride.

The reaction can be conducted at a temperature between about 25° C. and about 100° C. in a period between about 1 hour and about 6 hours at atmospheric pressure.

The following examples illustrate the preparation of the compounds. All percentages employed therein and elsewhere in this specification are by weight.

EXAMPLE 1

Preparation of 2,2'-methylenebis(4,6-di-tert.-butylresorcinol)

Into a 500 ml. reaction flask fitted with a thermometer, and reflux condenser was charged 22.2 g. of 4,6-di-tert.-butylresorcinol (0.1 mole), 200 ml. of heptane, 100 ml. of toluene and 5 ml. of concentrated hydrochloric acid. The mixture was warmed to 60° C. with good agitation. Formaldehyde (5.0 ml. of a 37% aqueous solution) was then slowly added over a period of 15 minutes. A mildly exothermic reaction was noted. The mixture was agitated at 70° C. for 1 hour and then cooled in an ice bath. The white crystalline product, after being filtered and washed with heptane, was dried under reduced pressure in a vacuum oven at 60° C. to produce 13.0 g. (57% yield) of 2,2'-methylenebis(4,6-di-tert.-butylresorcinol).

EXAMPLE 2

Preparation of 2,2'-thiobis(4,6-di-tert.-butylresorcinol)

Into a 250 ml. reaction flask fitted with a thermometer and reflux condenser was charged 4,6-di-tert.-butylresorcinol (22.2 grams) and perchlorethylene (60 ml.). Sulfur chloride (5.1 g. $SCl_2$) was then slowly added while agitating the mixture. When ¾ of the $SCl_2$ was added, a solid separated and 20 ml. of perchlorethylene was added to facilitate agitation. The mixture was further agitated at 25° C. for one hour and then cooled to 5° C. After filtration the precipitate was washed with heptane and dried to produce 10.0 g. of 2,2'-thiobis(4,6-di-tert.-butylresorcinol); M.P. 214–15° C.

To be effectively employed as a rodent repellent in many forestry applications, a compound must repel animals but not be harmful to the plants or trees to which it is applied.

In many cases, particularly in forestry applications, it is desirable to keep the rodents from consuming seeds and seedlings. It is, however, undesirable to destroy the rodents, to avoid severe upset of the biological balance in the forests.

This requirement imposes a number of restrictions on a substance to be suitable for use as non-toxic rodent-repellents in the protection of vegetation:

(1) They must repel rodents (and if possible other animals which consume seeds, seedlings and growing plants, e.g. deer);

(2) They must not be dangerously toxic to these animals, in the event of accidental ingestion;

(3) They must not significantly harm the plants they are intended to protect.

Tests devised to judge these properties include the following:

(1) A repellency test based on a measure of the tendency of rodents to forego favored foods when the latter are coated with the repellents;

(2) A toxicity test consisting of introducing orally into the rodents a graded series of dosages of toxicant to determine the dosage required to cause death in the animal;

(3) An observation of the response of Douglas fir seedlings (illustrative species of valuable evergreen forest trees) and of bean plants (illustrative of broad-leaved annual low growing plants), to having their leaves coted with the repellent substance. Failure in any of these respects would disqualify these substances for their intended use.

In the repellency tests, candidate materials are dissolved or dispersed in a suitable volatile medium (e.g. water, alcohol, acetone), and applied to wheat seeds so that the candidate compound constitutes about 2% by weight of the seeds. These seeds are fed at the rate of 25 seeds per day for three consecutive days to individually caged white-footed deer-mice (*Peromyscus maniculatus*). The mice also have access to standard laboratory rat food-pellets as a sustaining ration. When untreated seeds are used, or when seeds treated with non-repellent mixtures are offered, the wheat seeds are totally consumed each day in preference to the rat food-pellets.

When wheat seeds were coated with MDBR, 78% of the seeds offered remained unconsumed. When wheat seeds were coated with TDBR, 40% of the seeds offered were rejected.

In determining the toxicity of these substances a graded series of doses of a suspension of the test substances in corn oil was introduced orally into the mice. The average lethal dose was 1600 mg. of MDBR, or TDBR respectively per kg. of mouse body weight. Values in excess of about 300 mg./kg. can be considered non-toxic for practical purposes. Similar tests with rabbits were conducted at concentrations up to 470 mg./kg., with no observed death among the test animals. Thus the compounds are essentially non-toxic to both the mice and the rabbits.

To test for follar phytotoxicity, test compounds were formulated as suspensions at both 1% and 6% concentrations in an acetone-water-emulsifier containing 1% Carbopol (a commercial carboxylic polymer, used as a suspending agent, and to effect prolonged adherence to the leaves). The suspensions were brushed onto the leaves (or sprayed in some cases) of both bean plants and Douglas fir seedlings. No evidence of defoliation or other inhibition of growth was observed in the two weeks following application. (Phytotoxic chemicals generally produce loss of leaves, wilting and other signs of distress in less than 1 week.)

Since the purpose of these compounds is to function as a repellent, the precise concentration to be used may vary considerably. The presence of repellent on one leaf can by odor or other subtle method offer protection to a neighboring untreated leaf. The amount required may similarly be affected by other factors affecting the biological sensitivity of the mice. It is known, that starving animals will often ingest materials which otherwise would be repulsive to them. Protection under such cases might require very high concentrations of repellent.

It is therefore necessary to determine empirically for any given situation the amount of repellent required, and optimum method of distributing it among the plants to be protected.

The compounds can be applied to the seed, seedling, mature plant or tree with the conventional carriers (liquid or powder). Only a minor but effective amount is required which will depend on the type of foilage and rodent to be repelled, but can easily be determined. Accordingly the process of the invention is broadly a method for protecting vegetable organisms or plant life from rodents comprising treating said organism with a minor but effective amount of a compound of this invention.

What is claimed is:

1. A method of protecting plant life from rodents comprising applying to said plant life, a rodent repelling amount of a compound of the formula:

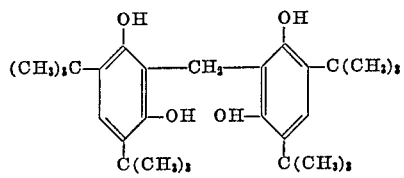

References Cited

UNITED STATES PATENTS 3,423,389    1/1969    Wheelus _____ 260—97.5

OTHER REFERENCES

Dorogova et al.: Chem. Abstr., pp. 114 and 418b, vol. 68, 1968.

ALBERT T. MEYERS, Primary Examiner

A. J. ROBINSON, Assistant Examiner

U.S. Cl. X.R.

47—57.6; 260—619 A